C. S. SMITH.
CLUTCH.
APPLICATION FILED AUG. 23, 1909.
1,047,713.
Patented Dec. 17, 1912.
3 SHEETS—SHEET 2.
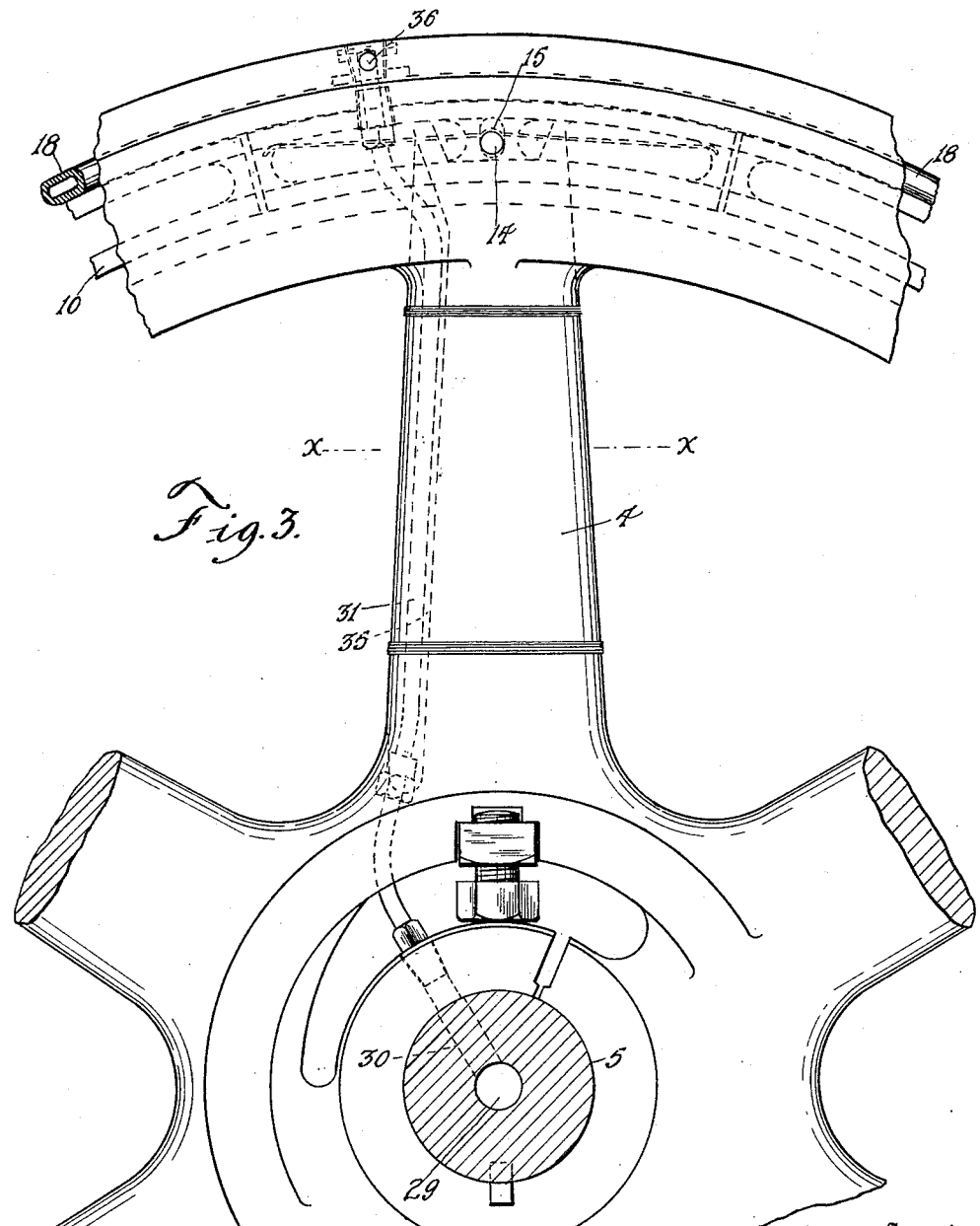

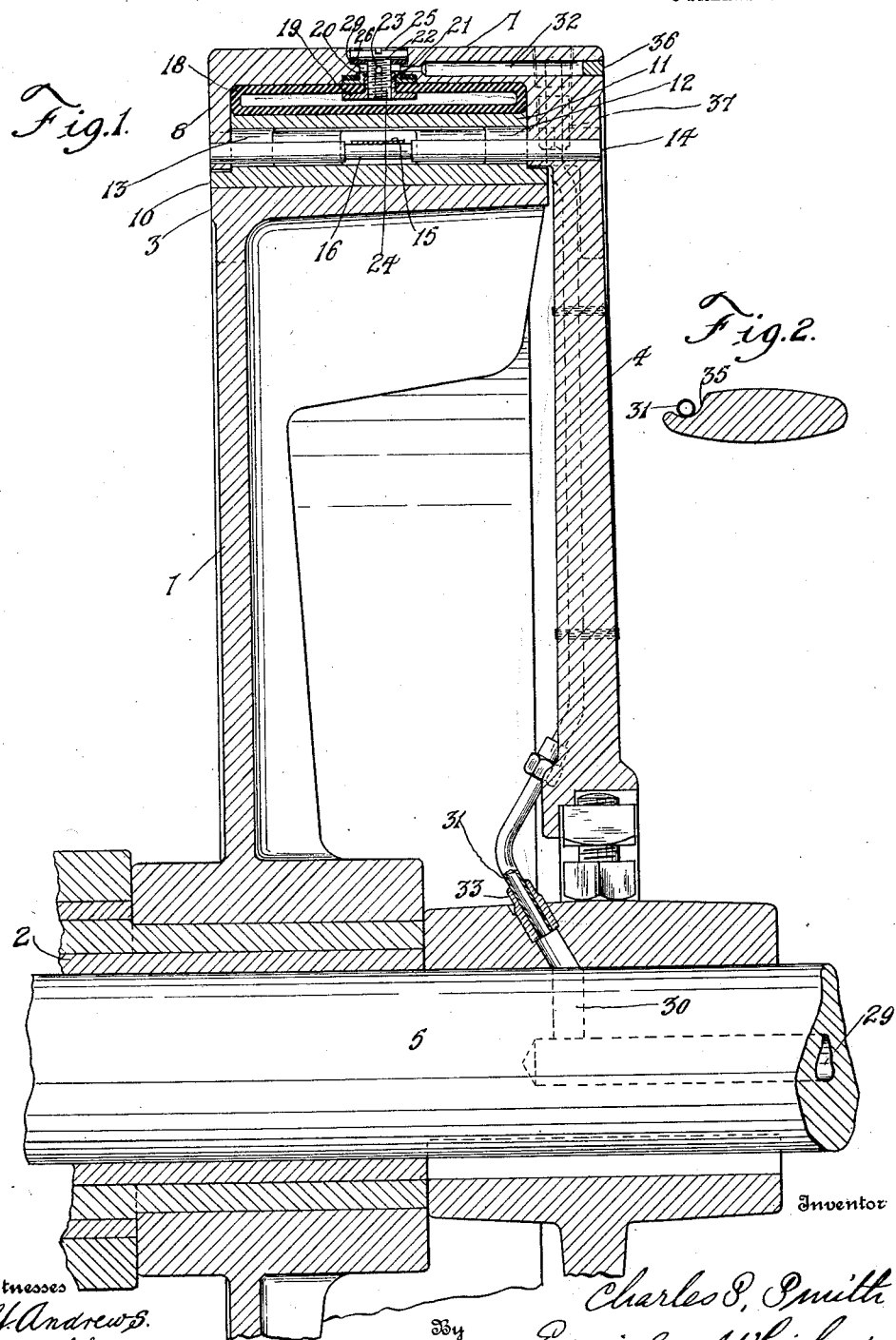
C. S. SMITH.
CLUTCH.
APPLICATION FILED AUG. 23, 1909.
1,047,713.
Patented Dec. 17, 1912.
3 SHEETS—SHEET 1.

C. S. SMITH.
CLUTCH.
APPLICATION FILED AUG. 23, 1909.
1,047,713.
Patented Dec. 17, 1912.
3 SHEETS—SHEET 3.
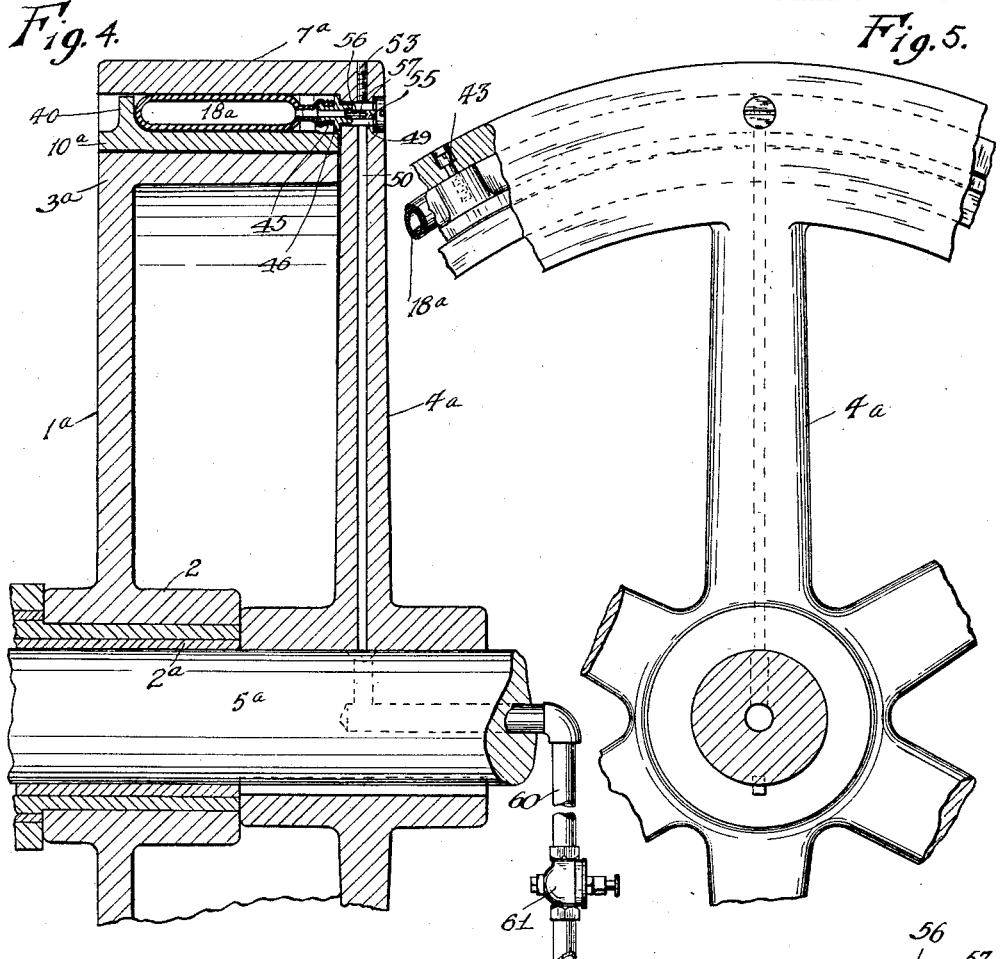
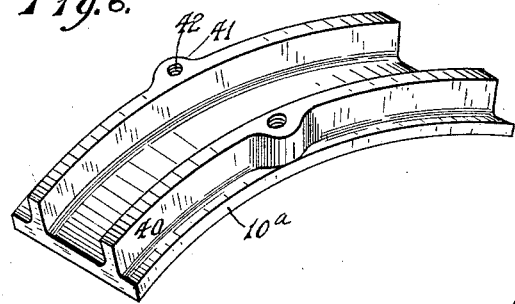
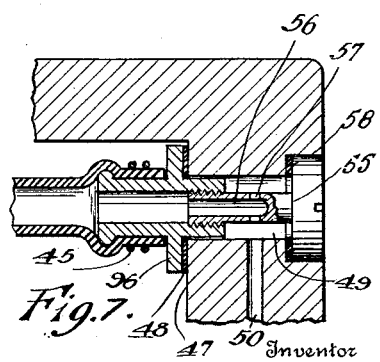
Witnesses
A. Y. Andrews.
P. Gotten.
Inventor
Charles S. Smith
By Brown & Wheeler
Attorneys

UNITED STATES PATENT OFFICE.

CHARLES S. SMITH, OF MILWAUKEE, WISCONSIN.

CLUTCH.

1,047,713. Specification of Letters Patent. Patented Dec. 17, 1912.

Application filed August 23, 1909. Serial No. 514,094.

*To all whom it may concern:*

Be it known that I, CHARLES S. SMITH, a citizen of the United States, residing at Milwaukee, county of Milwaukee, and State of Wisconsin, have invented new and useful Improvements in Clutches, of which the following is a specification.

My invention relates to improvements in speed regulating friction clutches and pertains especially to that class of clutches in which the pressure of the clutch shoes upon the friction bearing surfaces is regulated by a fluid pressure acting in opposition to centrifugal force to adjust the clutch shoes into position for motion transmission.

My invention may be considered as relating to clutches of the general type shown in Letters Patent of the United States to G. F. Leiger, #857,637.

The object of this invention is to provide improved means for applying the fluid pressure to the clutch shoes, regard being had for simplicity in structure, lightness in weight and durability, as well as for effectiveness in the operation of the clutch.

In the following description reference is had to the accompanying drawings in which, Figure 1 is a view in axial section of a portion of my improved clutch. Fig. 2 is a sectional view drawn on line x—x of Fig. 3. Fig. 3 is a side view of a portion of the clutch, showing the shaft in cross section. Figs. 4 and 5 are views similar to Figs. 1 and 3 respectively, showing a modified form of construction. Fig. 6 is a perspective view of one of the clutch shoes illustrated in Fig. 5. Fig. 7 is an enlarged detail view of the air duct connection of the driven portion of the clutch.

Like parts are identified by the same reference characters throughout the several views.

The driving member 1 of my improved clutch is mounted upon and keyed to a rotary sleeve 2 and provided with a rim 3. The driven member 4 is mounted upon and keyed to a shaft 5 which extends through the sleeve 2 and upon which, said sleeve, and the driving member, rotate. The driven member is provided with a rim 7 extending over the rim 3 and provided with an in-turned marginal flange 8. Clutch shoes are interposed between the rim 3 of the driving member and the rim 7 of the driven member, and are held in position between the flange 8 and the opposing wall of the driven member 4. The clutch shoes are segmental in form and arranged in an annular series around the rim 3. Each clutch shoe is provided with an inner bearing wall 10 and an outer wall 11, which walls are connected by web flanges 12 at suitable intervals, the space between the inner and outer walls 11 being otherwise open. Cross-pins 14 have their ends socketed in suitable apertures or recesses in the member 4 and flange 8, and extend through apertures 13 in the webs 12, these apertures being radially enlarged with reference to the diameter of the pins 14, whereby a limited radial movement of the clutch shoes is permitted. A spring 15 is preferably employed for each clutch shoe and arranged to bear upon the central portion of one of the cross-pins 14 with its ends socketed in the webs 12 in such a manner that the spring exerts an initial outward pressure upon the clutch shoes sufficient to cause them to separate from the rim 3 when without air pressure. The pins 14 may be conveniently reduced in size at the center, as indicated at 16, Fig. 1, the spring 15 bearing upon this reduced portion and serving to hold the pins in position against transverse movement, thus making it unnecessary to rivet or otherwise fasten the pins in position.

A flexible tube 18, annular in form, is interposed between the annular series of clutch shoes and the rim 7. This tube 18 is provided with a suitable aperture in its outer wall, having a bushing composed of two clamping members 19 and 20, the member 19 having a thimble 21 which extends through the apertures in the tube 18 and has screw threaded engagement with the member 20 exterior to said tube. The inner surface of the thimble 21 is also threaded to receive the tubular screw 22 having an aperture 23 and an interior duct 24 leading to the inner end of the screw and communicating with the interior of the tube 18. This screw is provided with a head 25, seated upon suitable packing 26 in a countersunk socket formed in the rim 7, thus making an air tight joint. Fluid under pressure is admitted to the tube 18 through a shaft duct 29, radial branch 30 thereof, and a tube 31 leading outwardly along the member 4 to a duct 32 in the rim 7, permitting a transverse delivery of the fluid into an annular channel 29, from which channel the fluid passes through the hole 23 and through the axial duct 24 in the screw 22 to the interior of tube 18. The tube 31 may be conveniently located in a recess 35 along one of the spokes of the member 4. The duct 32 may be formed by boring a transverse aperture in the rim 7, the outer end of which is then provided with a plug 36. The tube 31 is so located as to connect with this transverse aperture or duct 32 with a suitable stuffing nut at 37. The lower end of the tube 31 is connected with that portion of the branch duct 30 which extends into the hub of the driven member 4 by means of a tubular plug 33.

It will be understood that air or any other suitable fluid at the desired pressure, preferably a yielding or elastic fluid, will be supplied through the shaft duct 29 and the intervening tubes and ducts to the flexible annular tube 18, where it is permitted to act in opposition to the outward pressure of the clutch shoes when subjected to the said centrifugal force developed by rotation of the driven member, the fluid also acting in opposition to the pressure of the spring 16. When the fluid pressure is sufficient to push the clutch shoes into frictional engagement with the rim 3 of the driving member, motion will be transmitted from the driving member to the driven member until the speed of the latter develops sufficient centrifugal force in the clutch shoes to overcome the fluid pressure in the tube 18, and cause said fluid to yield sufficiently to cause the shoes to slip along the rim 3. By varying the fluid pressure, the speed of the driven member may be varied at will, regardless of the speed of the driving member.

Referring to Figs. 4 to 7 inclusive, it will be observed that the driving member 1ª, sleeve 2ª rim 3ª, driving member 4ª and shaft 5 are arranged in the same general relation as in Figs. 1 and 3, but the rim 7ª of the driven member has no in-turned flange corresponding with the flange 8 in Fig. 1. The clutch shoes may therefore be readily inserted and removed without separating the driving and driven members. Each clutch shoe comprises a segmental member 10ª, provided with outwardly extending longitudinal ribs 40 adapted to bear against the rim 7ª of the driven member. The shoes are loosely secured to the rim by lag bolts 43 having heads countersunk in suitable rim sockets, Fig. 6. The bolts extend loosely through holes in the rim and engage in threaded sockets 42 in the ribs 40, thus connecting the clutch-shoes to the rim 7ª of the driven member, but permitting limited radial movement of the shoe with reference thereto.

A pneumatic or fluid containing tube 18ª, similar to the tube 18 in Fig. 1, is located between the ribs 40 of the clutch shoes and is provided with a metallic tubular stem 45, having a collar 46 adapted to bear against the wall 47 of the member 4ª with interposed packing at 48, as shown in Fig. 5. The outer end of the stem 45 projects into a duct 49 in the member 4ª, preferably comprising a transverse bore or opening through the outer end of one of the spokes. A duct 50 leads from the duct 49 inwardly or longitudinally through the spoke and its hub, and communicates with the branch shaft duct 30. This duct 50 may be readily formed by boring a hole through the rim 7ª and the spoke, and then plugging the extremity of the bore as shown at 53. The outer end of the duct 49 is closed by a screw 55, which has its head counter-sunk in the outer surface of the member 4ª and has threaded engagement with the stem 45. This screw is provided with an axial duct 56 and one or more transverse apertures 57, and as the screw is of less diameter than the duct 49, communication is thus afforded between the duct 50 and the annular space formed by duct 49 around the apertured portion of the screw, and through the screw apertures to the interior of the stem 45, and thence into the tube 18. Packing 58 is interposed between the head of the screw 55 and the base of the counter-sunk socket which receives it.

With the above described construction, it is obvious that by removing screws 55 and the screws 43 which connect the clutch shoes with the rim 7ª, these clutch shoes and the flexible pneumatic tube 18ª may be removed bodily and from between the rims of the driving and driven members. The pneumatic tube 18ª preferably extends in the form of a ring, encircling that portion of the clutch shoes between the ribs 40. It is not essential to my invention that this pneumatic tube should be made thus continuous in preference to using separate tube sections for each clutch shoe, but the ring shaped tube is preferred, since it insures equal pressure upon all the shoes with less expense for construction than would otherwise be involved.

While I have described the member 1 as the driving member, I do not limit the scope of my invention to its use as such, since for some purposes it might be advisable to reverse the arrangement by applying the power to the shaft, and the member 1 or 1ª would then become the driven member. Neither do I limit the scope of my invention to the use of any specific material for the tube 18 or 18ª, nor to any specific form, shape or arrangement of the fluid containing chamber, for actuating the shoes, except that it must of course be expansible, and capable of yielding under excessive centrifugal pressures, although it is not essential to my invention whether the yielding is due to air expansion of some other portion of the wall, or a compression of the fluid contents, or a delivery of a portion of the fluid contents of said chamber at some other point.

The fluid used (preferably air) is delivered from any suitable source of supply through a pipe 60, and a pressure regulating valve 61 may be employed to vary the pressure as desired, and thus vary the speed of the driven member, or vary the point where the clutch will engage for motion transmission. Ordinarily, there will be sufficient leakage to relieve the excess pressure in the tube 18 or 18ª where the valve is set for lower pressure, but if desired, additional means may be employed to more promptly relieve the residual pressure.

Having thus described my invention what I claim as new and desire to secure by Letters Patent, is,

1. In a device of the described class, the combination of driving and driven members having parts concentric with each other, a clutch member, an expansible chamber interposed between said concentric parts, and means for delivering fluid under pressure to said chamber, said clutch member being interposed between the interior wall of said chamber and the driving member and arranged with reference to the chamber, in such relation as to apply the centrifugal force developed in the clutch member in opposition to the force of the fluid in said chamber.

2. In a device of the described class, the combination with driving and driven members having portions thereof traveling in concentric paths, of an expansible chamber located between said parts, a clutch member arranged to transmit motion from the driving to the driven member and to move by centrifugal force out of such motion transmitting relation, in opposition to the expansion of said chamber, said chamber having a movable member bearing upon the outer surface of the clutch member, and means for delivering fluid under yielding pressure to the expansible member.

3. In a device of the described class, the combination with a driving member having a peripheral bearing surface, a driven member, a clutch member movably connected with the driven member in operative relation to said bearing surface, an expansible chamber interposed between the walls of the clutch member and driven member, and means for delivering fluid under pressure to the expansible chamber.

4. In a device of the described class, the combination with a driving member having a peripheral bearing surface, a driven member, a clutch member movably connected with the driven member in operative relation to said bearing surface, an expansible chamber interposed between the walls of the clutch member and driven member, and means for delivering fluid under pressure to the expansible chamber, the connections of the clutch member with the driven member being arranged to permit the clutch member to move outwardly by centrifugal force into compressing relation to the expansible chamber.

5. In a device of the described class, the combination with driving and driven members, one having an annular peripheral bearing surface, a friction clutch member arranged to bear exteriorly upon the periphery of said surface, and movably connected with the other of said first mentioned members, an expansible chamber adapted when expanded to push the clutch member in the direction of said surface, and means for delivering an elastic fluid to the expansible chamber.

6. In a device of the described class, the combination with driving and driven members, one having an annular bearing surface, an annular series of outwardly movable friction clutches arranged to travel along said bearing surface and movably connected with the other of said members, an annular chamber encircling said series of friction clutches, and having a flexible wall bearing upon them, and means for delivering fluid under yielding pressure to said chamber.

7. In a device of the described class, the combination with driving and driven members, one having an annular bearing surface, an annular series of outwardly movable friction clutches arranged to travel along said bearing surface and movably connected with the other of said members, an annular chamber encircling said series of friction clutches, and having a flexible wall bearing upon them, and means for delivering fluid under yielding pressure to said chamber, together with means for varying the pressure of said fluid.

8. In a device of the described class, the combination of driving and driven members having concentric rim portions, a set of clutch members interposed between said rim portions and connected to the outer one in a manner to permit radial movements of the clutch members, a flexible walled tube encircling the clutch members, and inclosed by said members and the outer rim portion, and means for delivering fluid under any desired pressure to the interior of said tube.

In testimony whereof I affix my signature in the presence of two witnesses.

CHARLES S. SMITH.

Witnesses:
JOSEPH J. STAMM,
O. R. ERWIN.

Copies of this patent may be obtained for five cents each, by addressing the "Commissioner of Patents, Washington, D. C."